026-145 AU 291 EX
OR 14,736

DESIGN.

T. DAHL.

FIXTURE ARM.

APPLICATION FILED MAR. 26, 1919.

Reissued Oct. 14, 1919.

14,736.

Orig. Pat 53,

Thure Dahl
Inventor
By David Hart
Attorney

UNITED STATES PATENT OFFICE.

THURE DAHL, OF BROOKLYN, NEW YORK, ASSIGNOR TO LIGHTOLIER COMPANY, OF NEW YORK, N. Y., A CORPORATION OF NEW YORK.

DESIGN FOR A FIXTURE-ARM.

14,736. Specification for Reissued Design. Reissued Oct. 14, 1919.

Original No. 53,003, dated February 13, 1919, Serial No. 260,613, filed October 31, 1918, for 7 years. Application for reissue filed March 26, 1919. Serial No. 285,400. Term of patent 7 years.

*To all whom it may concern:*

Be it known that I, THURE DAHL, residing and having my post-office address at #328 73d street, borough of Brooklyn, county of Kings, State of New York, and a subject of the King of Sweden, have invented a new, original, and ornamental Design for Fixture-Arms, of which the following is a specification, reference being had to the accompanying drawing, forming part thereof.

Figure 1:
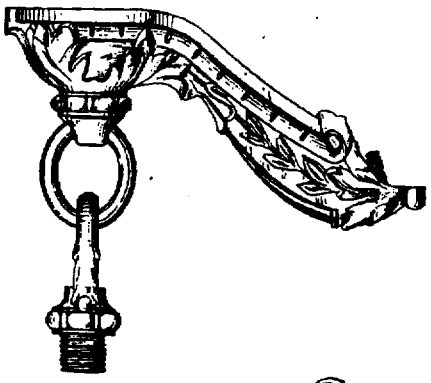
Figure 2:
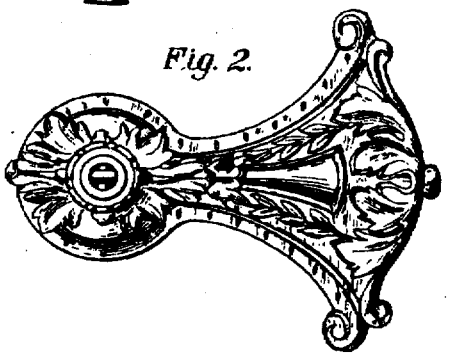

Figure 1 is a side elevation, and Fig. 2 is a bottom plan view of a fixture arm, showing my new design.

I claim:

The ornamental design for a fixture arm, as shown.

THURE DAHL.

Witnesses:

DAVID HAAR,

MOSES D. BLITZER.

Copies of this patent may be obtained for five cents each, by addressing the "Commissioner of Patents, Washington, D. C."